United States Patent
Wanner

(10) Patent No.: US 11,325,709 B1
(45) Date of Patent: May 10, 2022

(54) UPPER SHELL INCLUDING AN ACTUATABLE POCKET FOR AN AIRCRAFT SEAT

(71) Applicant: B/E Aerospace, Inc., Winston-Salem, NC (US)

(72) Inventor: Jackson R Wanner, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/133,461

(22) Filed: Dec. 23, 2020

(51) Int. Cl.
*B64D 11/00* (2006.01)
*B64D 11/06* (2006.01)

(52) U.S. Cl.
CPC .... *B64D 11/00152* (2014.12); *B64D 11/0638* (2014.12)

(58) Field of Classification Search
CPC ................... B64D 11/00152; B64D 11/0638
See application file for complete search history.

(56) References Cited

U.S. PATENT DOCUMENTS

| | | | |
|---|---|---|---|
| 6,601,913 B2 | 8/2003 | Romca et al. | |
| 9,067,510 B2 | 6/2015 | Westerink et al. | |
| 10,065,741 B1 | 9/2018 | Pozzi et al. | |
| 10,144,515 B2 | 12/2018 | Le et al. | |
| 10,293,943 B1 | 5/2019 | Pozzi et al. | |
| 2016/0023766 A1* | 1/2016 | Pajic | 108/28 |
| 2016/0280376 A1* | 9/2016 | Pozzi | B64D 11/00152 |
| 2017/0088265 A1* | 3/2017 | Brick | B64D 11/00152 |
| 2018/0111566 A1 | 4/2018 | Hugh et al. | |
| 2019/0291870 A1 | 9/2019 | Hall | |
| 2020/0172250 A1 | 6/2020 | Drenzeck et al. | |
| 2020/0307804 A1 | 10/2020 | Challenor | |

FOREIGN PATENT DOCUMENTS

| | | | |
|---|---|---|---|
| EP | 2589536 B1 | 7/2014 | |
| EP | 3042852 A1 | 7/2016 | |
| JP | S60110544 A | 6/1985 | |
| WO | WO-2017074271 A1 * | 5/2017 | B64D 11/00152 |

* cited by examiner

*Primary Examiner* — Anthony D Barfield
(74) *Attorney, Agent, or Firm* — Suiter Swantz pc llo

(57) ABSTRACT

An upper shell for an aircraft seat may include a main body, and an upper pocket. The upper pocket may include a pocket flap coupled to the main body via at least one pocket flap hinge. The upper pocket may include a pocket cavity defined within the main body. The pocket cavity may be accessible following an actuation of the pocket flap into a pocket flap open position via the at least one pocket flap hinge. The pocket flap may be configured to cover at least a portion of the pocket cavity when the pocket flap is in a pocket flap closed position. The upper shell for the aircraft seat may include a personal electronic device (PED) holder assembly with a PED cavity defined within an area of the upper pocket, and a PED holder configured to fit within the PED cavity when in a PED holder closed position.

17 Claims, 14 Drawing Sheets

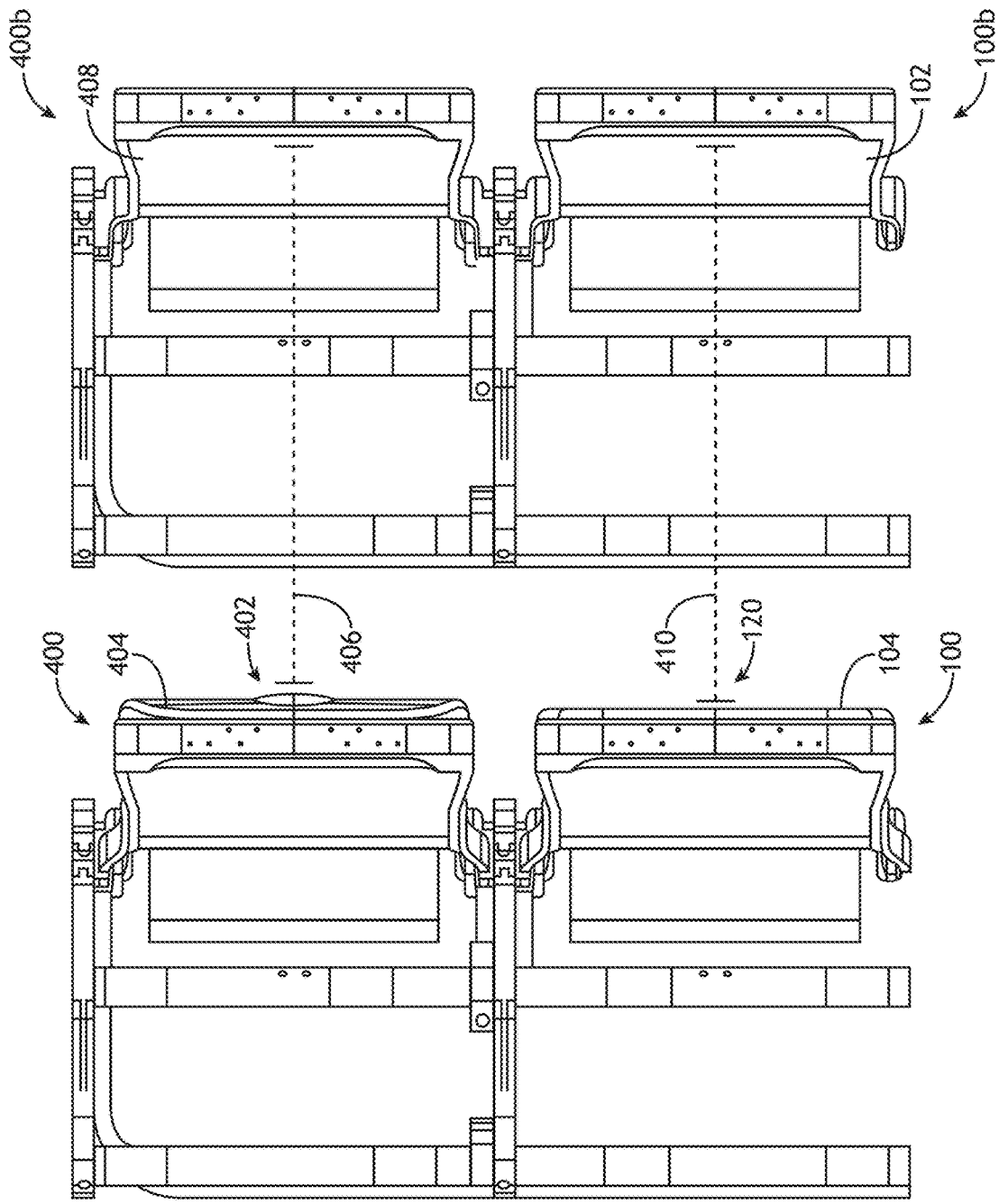

UPPER SHELL INCLUDING AN ACTUATABLE POCKET FOR AN AIRCRAFT SEAT

BACKGROUND

A seatback of an aircraft seat may include pockets for a user (e.g., passenger, crew member, or the like) in an adjacent aircraft seat. Living space, or a distance between the user in the adjacent aircraft seat and the seatback including the pockets, surrounding the adjacent aircraft seat may be reduced or otherwise impacted depending on the location of the pockets on the rear surface of the aircraft seat. The pockets may be designed to prevent interference with an aircraft tray table coupled to the seat of the aircraft seat.

In addition to the pockets, the seatback of the aircraft seat may include personal electronic device (PED) holders for the user in the adjacent aircraft seat. The PED holders may be positioned within or proximate to the aircraft tray table. Such positioning, however, may be difficult for the user in the adjacent aircraft seat due to viewing angle, loss of aircraft tray table usage while the PED is being supported, or the like.

SUMMARY

An upper shell for an aircraft seat is disclosed, in accordance with one or more embodiments of the disclosure. The upper shell for the aircraft seat may include a main body. The upper shell for the aircraft seat may include an upper pocket. The upper pocket may include a pocket flap coupled to the main body via at least one pocket flap hinge. The upper pocket may include a pocket cavity defined within the main body. The pocket cavity may be accessible following an actuation of the pocket flap into a pocket flap open position via the at least one pocket flap hinge. The pocket flap may be configured to cover at least a portion of the pocket cavity when the pocket flap is in a pocket flap closed position. The upper shell for the aircraft seat may include a personal electronic device (PED) holder assembly. The PED holder assembly may include a PED holder coupled to at least one of the pocket flap or the main body via at least one PED hinge. The PED holder may be configured to hold a PED following an actuation of the PED holder into a PED holder open position via the at least one PED hinge. The PED holder assembly may include a PED cavity defined within an area of the upper pocket. The PED holder may be configured to fit within the PED cavity when in a PED holder closed position. The PED holder assembly may be positioned in an area defined within the upper pocket.

In some embodiments, the upper pocket may include a flat vertical exterior surface visible when the pocket flap is in the pocket flap closed position. The PED holder may include a flat vertical exterior surface visible when the PED holder is in the PED holder closed position.

In some embodiments, the main body may include a lip configured to make contact with the pocket flap and configured to prevent the pocket flap from entering the pocket cavity when the pocket flap is in the pocket flap closed position.

In some embodiments, the lip may be configured to make contact at one or more points along the pocket flap.

In some embodiments, a section of the pocket flap proximate to the one or more points along the pocket flap and an interior pocket cavity surface may define a gap for access to the pocket cavity when the pocket flap is in the closed position.

In some embodiments, at least a portion of the main body defining the pocket cavity may be surrounded by an upper seat frame.

In some embodiments, the PED holder may include a body. The PED holder may include a primary jaw coupled to the body. PED holder may include a groove defined within the body. The groove may be defined by at least one surface of the body and at least one surface of the primary jaw.

In some embodiments, the groove may be slanted at an angle. The angle may be selected to hold a PED inserted within the groove at a select viewing angle.

In some embodiments, the PED holder may include a spring-loaded auxiliary jaw coupled to the body via a bracket. The spring-loaded auxiliary jaw may be configured to provide a force against the PED inserted into the channel to hold the PED within the channel.

In some embodiments, the PED holder may include a recess defined within at least a second surface of the body and at least a second surface of the primary jaw.

In some embodiments, the PED cavity may include a depth less than a thickness of the pocket flap In some embodiments, the upper shell may include one or more channels coupled to the pocket cavity. The upper shell may include one or more openings coupled to the one or more channels. The one or more channels and one or more openings may be configured to allow for the exit of waste from the pocket cavity.

In some embodiments, the one or more channels may be defined by at least one of an interior rear bezel or an exterior rear bezel. The one or more openings may be cut within the exterior rear bezel.

In some embodiments, the upper shell may include a latch assembly. The latch assembly may include a first component coupled to the main body. The latch assembly may include a second component on an aircraft tray table coupled to the aircraft seat.

An upper shell for an aircraft seat is disclosed, in accordance with one or more embodiments of the disclosure. The upper shell for the aircraft seat may include a main body. The upper shell for the aircraft seat may include an upper pocket. The upper pocket may include a pocket flap coupled to the main body via at least one pocket flap hinge. The upper pocket may include a pocket cavity defined within the main body. The pocket cavity may be accessible following an actuation of the pocket flap into a pocket flap open position via the at least one pocket flap hinge. The pocket flap may be configured to cover at least a portion of the pocket cavity when the pocket flap is in a pocket flap closed position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4D illustrates a comparison between an aircraft seat including a static pocket and an aircraft seat including an actuatable upper pocket, in accordance with one or more embodiments of the disclosure.

DETAILED DESCRIPTION OF THE INVENTION

Figure 1A:
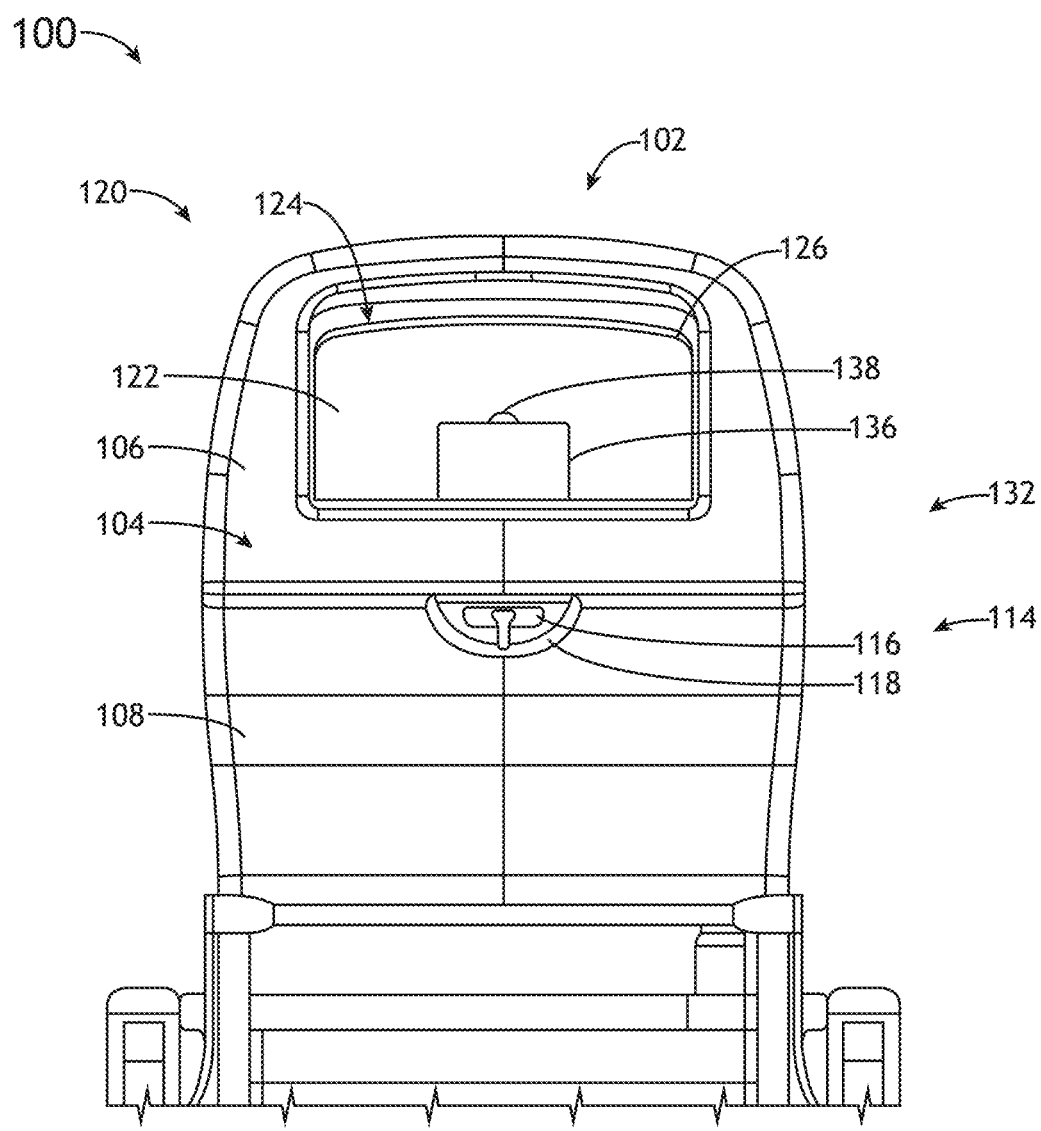
FIG. 1A illustrates a rear view of a portion of an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1 a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-4D in general illustrate an actuatable pocket for an aircraft seat, in accordance with one or more embodiments of the disclosure.

A seatback of an aircraft seat may include pockets for a user (e.g., passenger, crew member, or the like) in an adjacent aircraft seat. Living space, or a distance between the user in the adjacent aircraft seat and the seatback including the pockets, surrounding the adjacent aircraft seat may be reduced or otherwise impacted depending on the location of the pockets on the rear surface of the aircraft seat. The pockets may be designed to prevent interference with an aircraft tray table coupled to the seat of the aircraft seat.

In one example, the pockets may be lower pockets located on the seatback of the aircraft seat proximate to the knees of the user in the adjacent aircraft seat. In another example, the pockets may be upper pockets located on the seatback of the aircraft seat proximate to the head of the user in the adjacent aircraft seat. Where the pockets are upper pockets, the upper pockets may be a large static bezel (e.g., not actuatable), which may require overhead clearance to access literature stored within the upper pockets. Although the upper pockets may increase the living space proximate to the knees of the user in the adjacent aircraft seat, the increased living space may be at the expense of the living space proximate to the head of the user.

In addition to the pockets, the seatback of the aircraft seat may include personal electronic device (PED) holders for the user in the adjacent aircraft seat. The PED holders may be positioned within or proximate to the aircraft tray table. Such positioning, however, may be difficult for the user in the adjacent aircraft seat due to viewing angle, PED size, loss of aircraft tray table usage while the PED is being supported, or the like.

As such, it would be beneficial to provide an upper pocket for the aircraft seat. For example, the upper pocket should include an actuatable pocket flap, allowing the upper pocket to be more compact to increase the living space proximate to the head of the user in the adjacent aircraft seat as compared to the living space afforded by a large static bezel upper pocket. In addition, it would be beneficial to provide a PED holder with the upper pocket. For example, the PED holder being positioned within the upper pocket may provide an improved viewing angle of the PED for the user and/or allow for the simultaneous support of the PED and usage of the aircraft tray table.

FIGS. 1A-1D in general a portion of an aircraft seat 100, in accordance with one or more embodiments of the disclosure.

The aircraft seat 100 may include a seatback 102. The aircraft seat 100 may include coupled and/or integrated components such as, but not limited to, seat frames, seat cushions, pivoting armrests, seatbelts, or the like. The seatback 102 may include an upper shell 104 with a main body 106.

The aircraft seat 100 may include an aircraft tray table 108. The upper shell 104 may form at least a portion of the seatback 102 above the aircraft tray table 108. For example, the upper shell 104 may form the entire area of the seatback 102 above the aircraft tray table 108. The upper shell 104 may form a portion of the seatback 102 above the aircraft tray table 108, and a second portion of the seatback 102 may be formed by at least one auxiliary component. For example, the at least one auxiliary component may include an exterior rear plate or rear bezel 110, an interior rear plate or rear bezel 112, a cushion, or the like. It is noted herein the upper shell 104, the exterior rear bezel 110, and/or the interior rear bezel 112 may be fabricated as separate, coupled component. In addition, it is noted herein the upper shell 104, the exterior rear bezel 110, and/or the interior rear bezel 112 may be fabricated as a single component.

The aircraft tray table 108 may be actuatable between a stowed position and one or more deployed positions. For example, the aircraft tray table 108 may be actuatable between the stowed position and a first deployed position via a hinge. By way of another example, the aircraft tray table 108 may be actuatable between the first deployed position and at least a second deployed position via a set of rails or tray table support arms. It is noted herein a discussion of components in an aircraft tray table may be found in U.S. application Ser. No. 17/081,840, titled AIRCRAFT TRAY TABLE RETENTION ASSEMBLY, filed on Oct. 27, 2020, which is incorporated herein in the entirety.

Figure 1B:
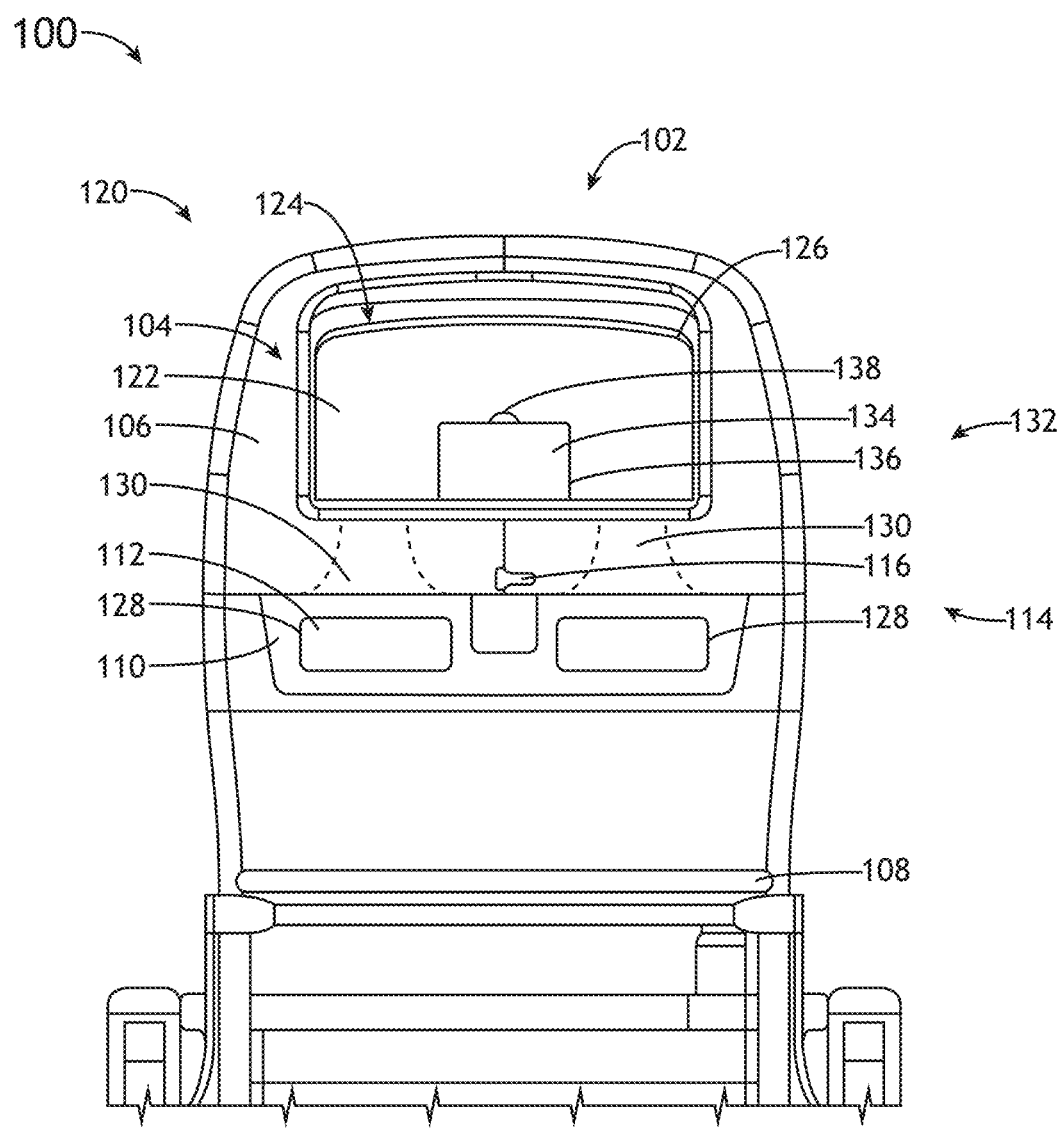
FIG. 1B illustrates a rear view of a portion of an aircraft seat, in accordance with one or more embodiments of the disclosure.
Figure 1C:
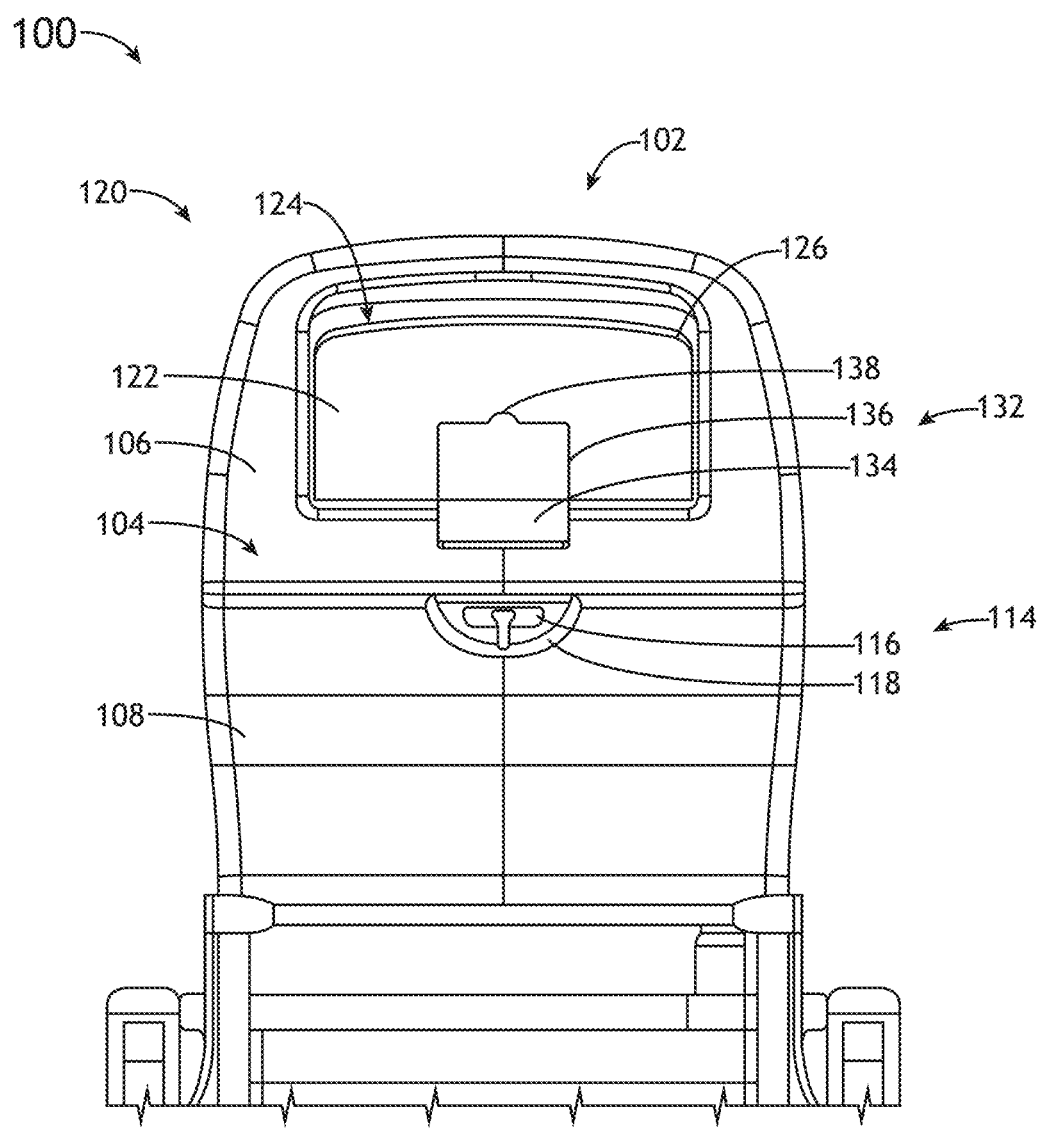
FIG. 1C illustrates a rear view of a portion of an aircraft seat, in accordance with one or more embodiments of the disclosure.

The aircraft tray table 108 may be held in the stowed position by a retention assembly 114. For example, as illustrated in FIGS. 1A and 1B, the retention assembly 114 may be a retainer latch assembly with a latch 116 configured to engage with a surface 118 on the aircraft tray table 108. For instance, the latch 116 may be coupled to the main body 106 of the upper shell 104 or an auxiliary component (e.g., the exterior rear bezel 110, or the like) of the seatback 102. By way of another example, as illustrated in FIG. 1C, the retention assembly 114 may be a magnetic retention assembly including one or more magnetic components. It is noted herein a discussion of the use of magnetic components in a retention assembly for an aircraft tray table may be found in U.S. application Ser. No. 17/081,840, titled AIRCRAFT TRAY TABLE RETENTION ASSEMBLY, filed on Oct. 27, 2020, which is previously incorporated herein in the entirety.

The upper shell 104 may include one or more upper pockets 120. The one or more upper pockets 120 may include one or more pocket flaps 122. The one or more pocket flaps 122 may be configured to provide access to one or more pocket cavities 124 defined within the main body 106 of the upper shell 104. The one or more pocket flaps 122 may include a surface or edge 126 configured to allow a user (e.g., passenger, crew member, or the like) to engage and actuate the one or more pocket flaps 122 to obtain access to the one or more pocket cavities 124.

In general, the one or more pocket flaps 122 may be configured to allow the user to interact with the one or more pocket flaps 122 along at least one of a side surface, an edge, and/or a corner, in order to cause the one or more pocket flaps 122 to obtain access to the one or more pocket cavities 124. It is noted herein the side surface, the edge, and/or the corner may be smooth, or may include one or more grooves or indentations for a user to engage when actuating the one or more pocket flaps 122 to obtain access to the one or more pocket cavities 124.

The upper shell 104 and/or the one or more auxiliary components may include one or more openings 128. The one or more openings 128 may allow for waste (e.g., paper scraps, food particles, dirt, or the like) to exit from the one or more pocket cavities 124. For example, the one or more openings 128 may be coupled to the one or more pocket cavities 124 within the upper shell 104 via one or more channels 130.

The upper shell 104 may include one or more personal electronic device (PED) holder assemblies 132. For example, the one or more PED holder assemblies 132 may be positioned in an area of the upper shell 104 defined within the one or more upper pockets 120. By way of another example, the one or more PED holder assemblies 132 may be located in the upper shell 104 at a location of the upper shell 104 separate from the one or more pocket flaps 122. The one or more PED holder assemblies 132 may include one or more PED holders 134. The one or more PED holders 134 may be configured to fit within one or more PED cavities 136 defined within the upper shell 104. The one or more PED holders 134 may include a slot or groove 138 on an exterior surface of a pocket flap 122, where the groove 138 is configured to allow a user (e.g., passenger, crew member, or the like) to engage and actuate the one or more PED holders 134.

In general, the one or more PED holders 134 may be configured to allow the user to interact with the one or more PED holders 134 along at least one of a side surface, an edge, and/or a corner, in order to actuate the one or more PED holders 134. It is noted herein the side surface, the edge, and/or the corner may be smooth, or may include one or more grooves or indentations for a user to engage when actuating the one or more PED holders 134.

It is noted herein an exterior outer surface of the main body 106 of the upper shell 104 and an exterior outer surface of the pocket flap 122 may be co-planar when the pocket flap 122 is in the closed position. For example, the pocket flap 122 and the upper shell 104 may include flat vertical (or substantially vertical) exterior surfaces (e.g., as opposed to a concave surface). In addition, it is noted herein an exterior outer surface of the PED holder 134 and an exterior surface of the pocket flap 122 may be co-planar when the PED holder 134 is in the closed position. For example, the PED holder 134 and the pocket flap 122 may include flat vertical (or substantially vertical) exterior surfaces (e.g., as opposed to a concave surface).

Figure 1D:
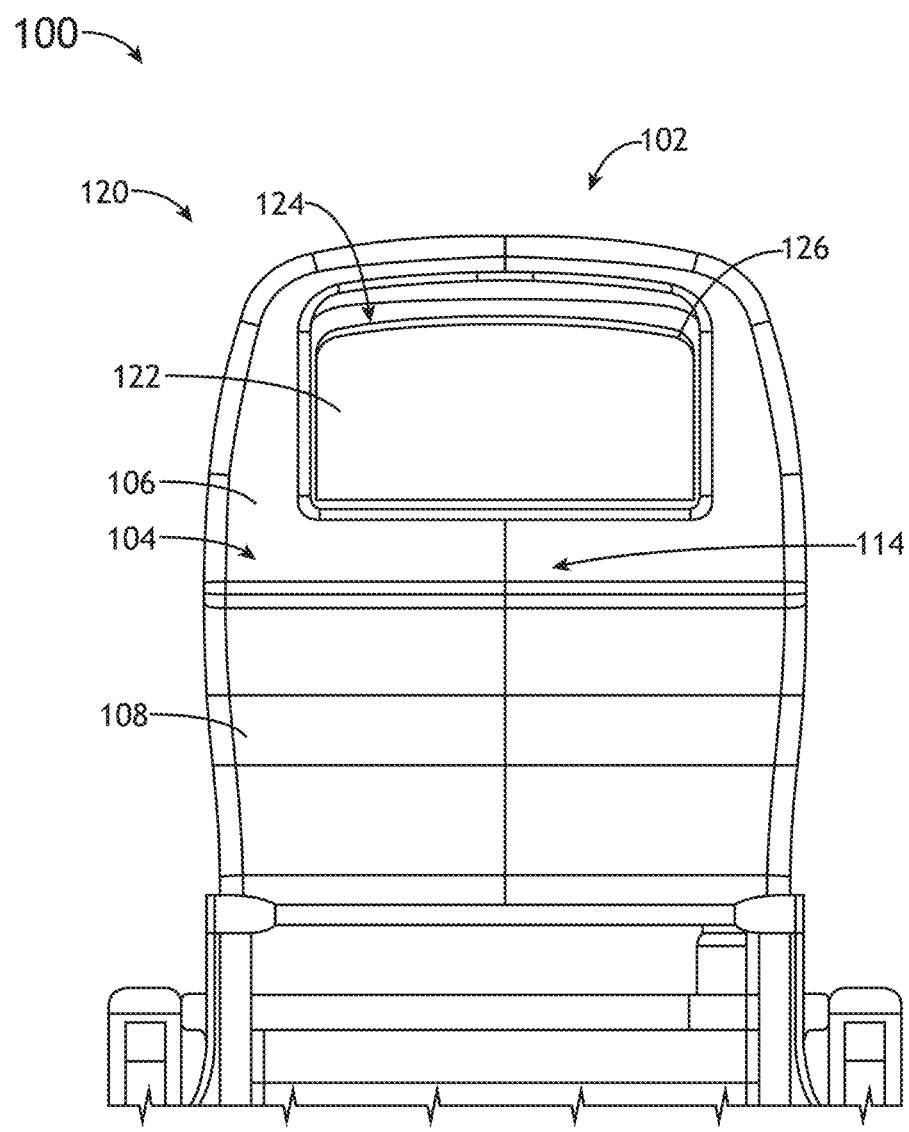
FIG. 1D illustrates a rear view of a portion of an aircraft seat, in accordance with one or more embodiments of the disclosure.
Figure 2A:
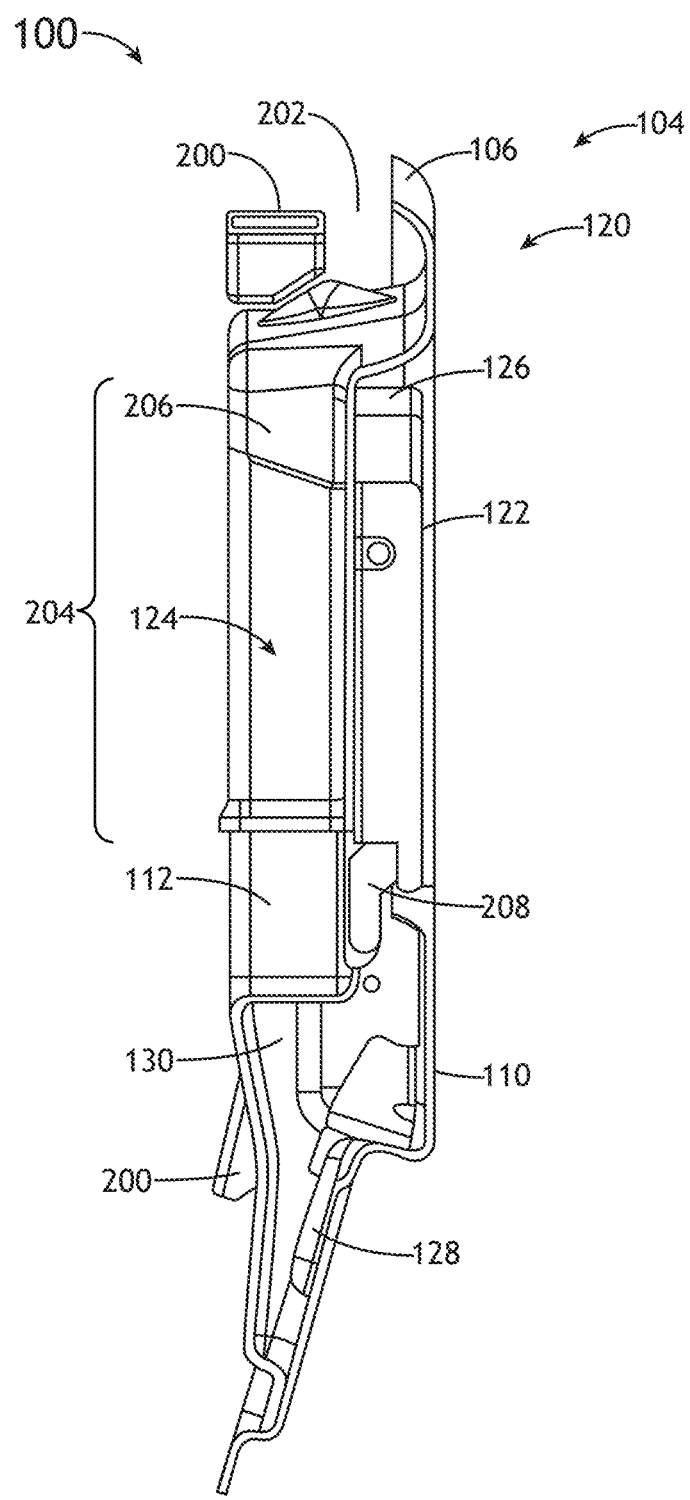
FIG. 2A illustrates a cross-section view of a portion of an aircraft seat, in accordance with one or more embodiments of the disclosure.
Figure 2B:
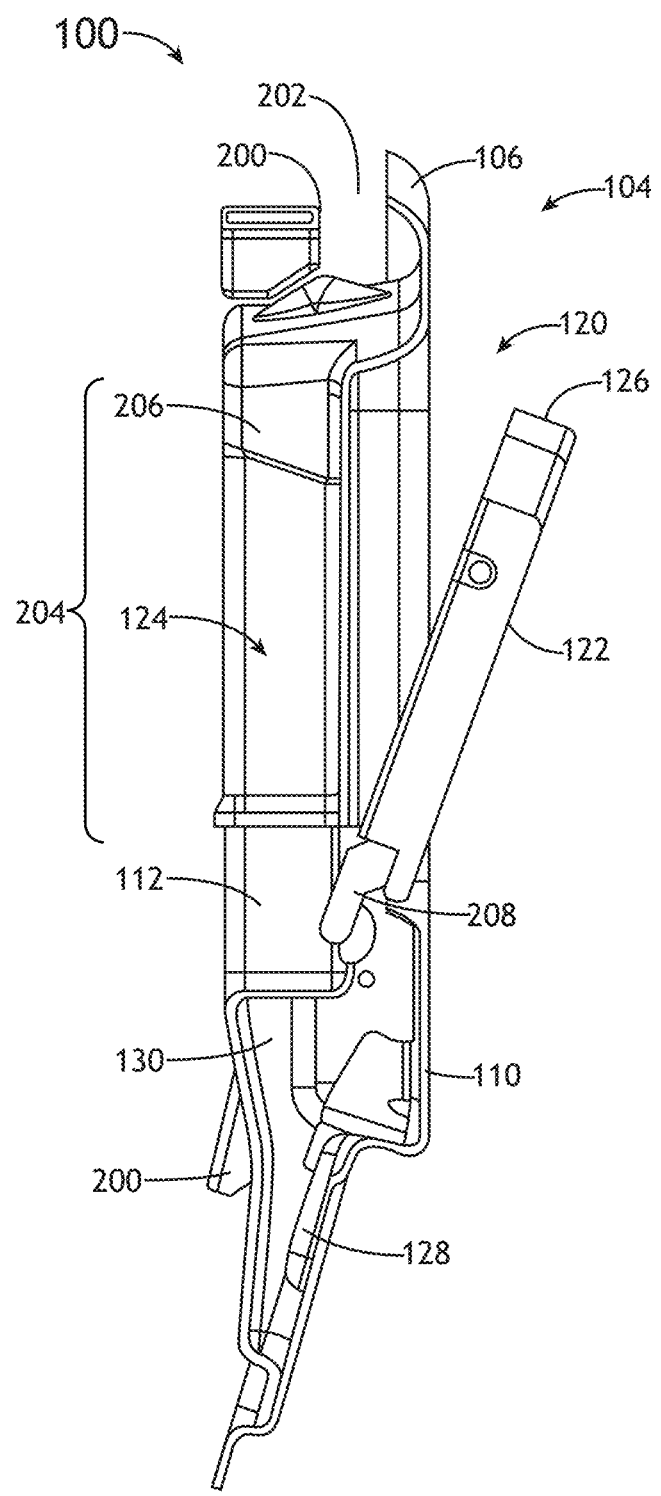
FIG. 2B illustrates a cross-section view of a portion of an aircraft seat, in accordance with one or more embodiments of the disclosure.
Figure 2C:
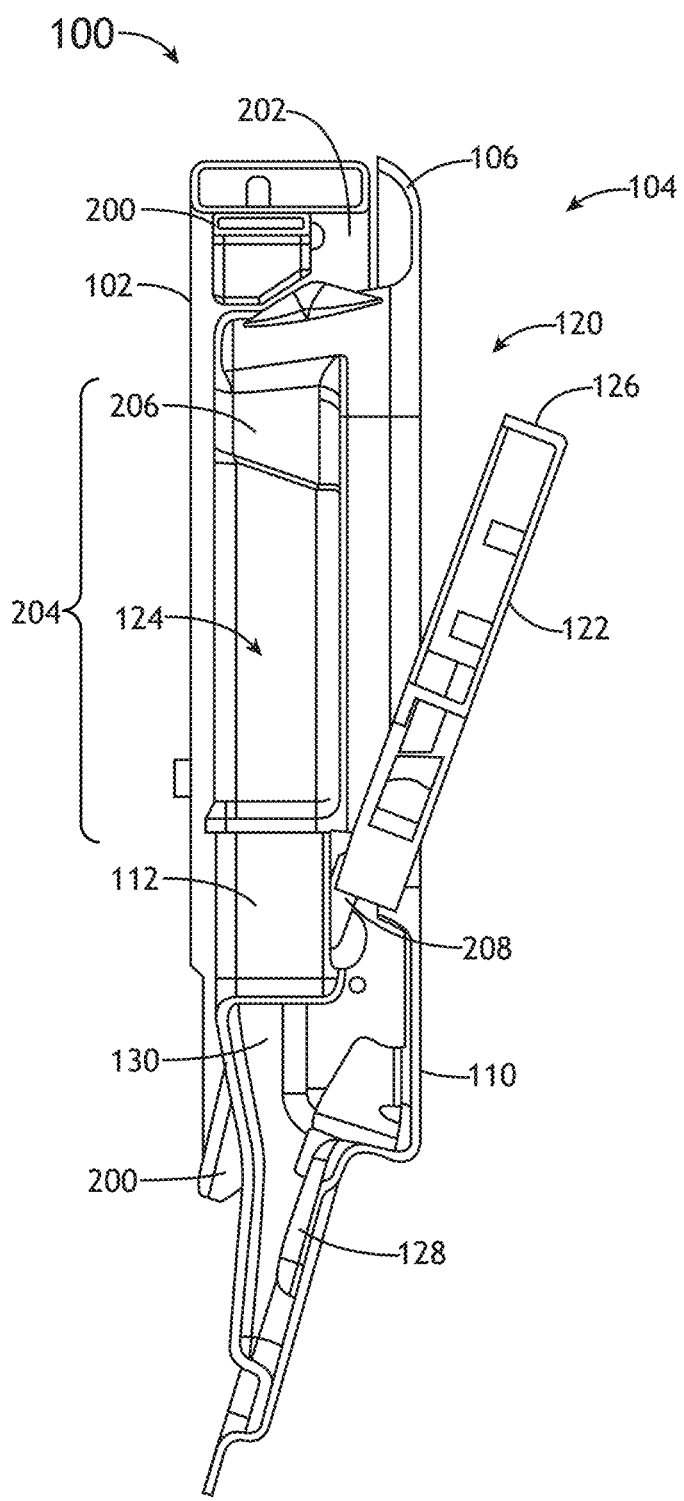
FIG. 2C illustrates a cross-section view of a portion of an aircraft seat, in accordance with one or more embodiments of the disclosure.
Figure 2D:
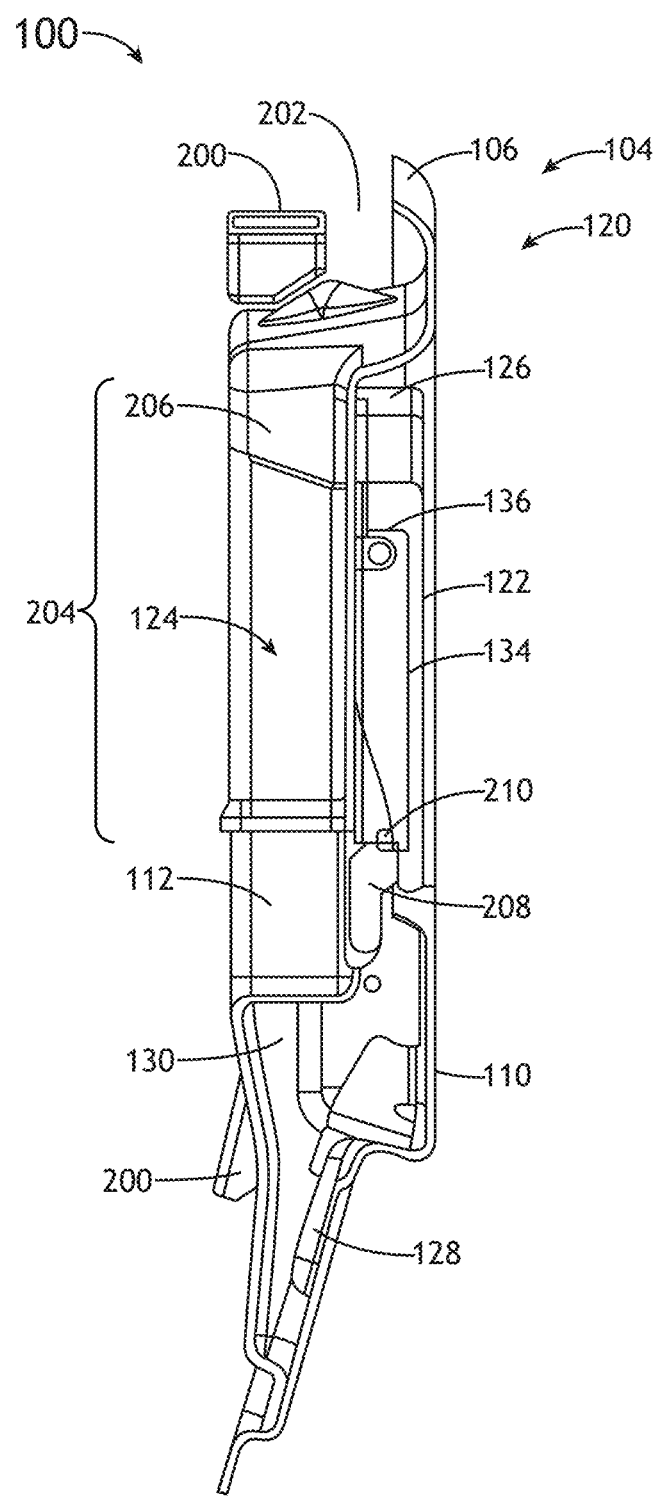
FIG. 2D illustrates a cross-section view of a portion of an aircraft seat, in accordance with one or more embodiments of the disclosure.
Figure 2E:
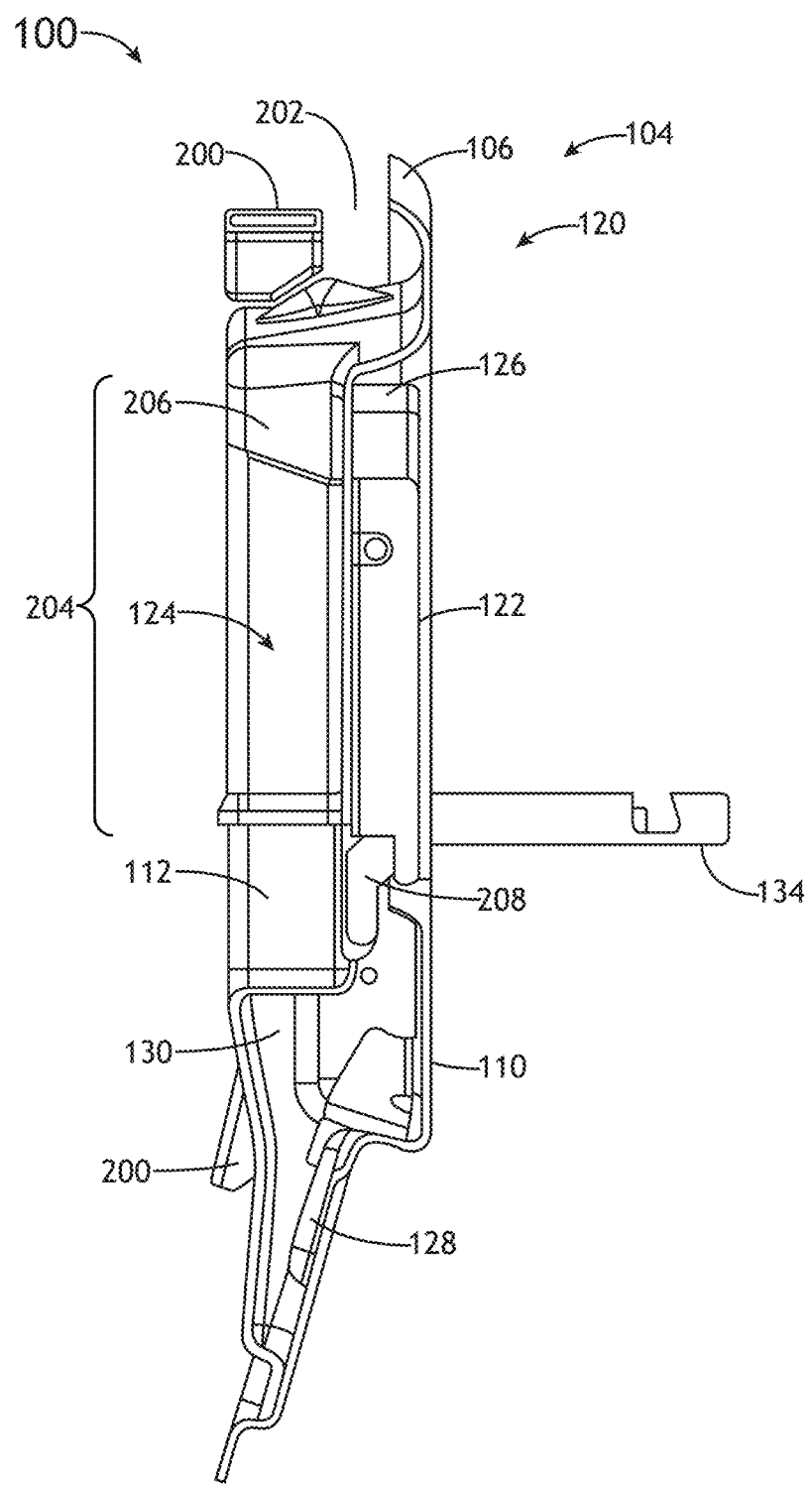
FIG. 2E illustrates a cross-section view of a portion of an aircraft seat, in accordance with one or more embodiments of the disclosure.

Although embodiments of the disclosure in FIGS. 1A-1C illustrate the upper shell 104 as including the one or more PED holder assemblies 132, it is noted herein the upper shell 104 may only include the one or more upper pocket assemblies 120 and not include the one or more PED holder assemblies 132, as illustrated in FIG. 1D. Therefore, the above description should not be interpreted as a limitation on the present disclosure but merely an illustration.

FIGS. 2A-2E in general illustrate cross-section views of a portion of the aircraft seat 100, in accordance with one or more embodiments of the disclosure.

The aircraft seat 100 may include an upper seat frame 200. The main body 106 of the upper shell 104 and/or the one or more auxiliary components (e.g., the interior rear bezel 112 and/or the exterior rear bezel 110) may be coupled to the upper seat frame 200. The upper seat frame 200 may be inset within a groove 202 of the upper shell 104. A portion 204 of the main body 106 of the upper shell 104 defining the pocket cavity 124 may be surrounded by the upper seat frame 200. It is noted herein, however, the portion 204 of the upper shell 104 defining the pocket cavity 124 may be set outside of (e.g., in front of) the upper seat frame 200.

The main body 106 of the upper shell 104 may include a lip 206 configured to make contact with the pocket flap 122 when the pocket flap 122 is in a closed position. For example, the lip 206 may make contact along a section of the pocket flap 122 proximate to the surface or edge 126. For instance, the lip 206 may make contact at one or more points along the pocket flap 122 proximate to the surface or edge 126, while a section of the pocket flap 122 proximate to the one or more points along the pocket flap 122 and an interior pocket cavity surface may define a gap for access to the pocket cavity 124 when the pocket flap 122 is in the closed position. In addition, the lip 206 may make contact along the entire section of the pocket flap 122 proximate to the surface or edge 126, such that a second section of the pocket flap 122 is not open to the pocket cavity 124 when the pocket flap 122 is in the closed position. It is noted herein the lip 206 being in contact with the pocket flap 122 may prevent access to the pocket cavity 124 when the pocket flap 122 is in the closed position, and may prevent the pocket flap 122 from entering or collapsing into the pocket cavity 124.

The pocket flap 122 may actuate (e.g., fold down, or the like) to allow access to items (e.g., literature, sick bags, PEDs, or the like) stored in the pocket cavity 124 defined within the upper shell 104 and protected by the pocket flap 122. It is noted herein the items being within the pocket may allow for a cleaner, more organized-appearing aircraft cabin including the aircraft seat 100.

Although embodiments of the disclosure illustrate a single pocket cavity 124, it is noted herein the pocket cavity 124 may be sectioned or may be one of multiple pocket cavities 124. For example, the pocket cavity 124 may be sectioned with a separator coupled to a surface of the upper shell 104 in the pocket cavity 124 and configured to separate airline-provided items (e.g., aircraft literature, sick bags, or the like) from user-owned items (e.g., literature, PEDs, or the like). For instance, the separator may be mesh, plastic, or other material configured to section the pocket cavity 124. In addition, the separator may be coupled to the surface of the upper shell 104 in the pocket cavity 124 via an interlocking assembly, a hook or clasp, a hinge, or the like.

The pocket flap 122 may be coupled to the main body 106 of the upper shell 104 via one or more pocket flap hinges 208. For example, the one or more pocket flap hinges 208 may include, but are not limited to, torque hinges. By way of another example, the one or more pocket flap hinges 208 may be spring-loaded. The pocket flap 122 may be configured to actuate relative to the upper shell 104 via the one or more pocket flap hinges 208 to allow for access to the one or more pocket cavities 124. For example, the pocket flap 122 may rotate about the one or more pocket flap hinges 208 through a select angular range. For instance, the pocket flap 122 may rotate about the one or more pocket flap hinges 208 between 0 degrees and 45 degrees. In addition, the pocket flap 122 may rotate about the one or more pocket flap hinges 208 between −15 degrees and 155 degrees. It is noted herein the pocket flap 122 may be usable as a tray surface when rotated to 90 degrees. In addition, it is noted herein the upper pocket 120 may be configured to prevent the pocket flap 122 from rotating beyond 90 degrees.

The one or more pocket flap hinges 208 may be configured to hold the one or more pocket flaps 122 in the closed position absent an external force being applied to the one or more pocket flaps 122 (e.g., by a user). The one or more pocket flap hinges 208 may be configured to return the one or more pocket flaps 122 from an open position to a closed position when an external force applied to the one or more pocket flaps 122 (e.g., by a user, by an object set on the one or more pocket flaps 122, or the like) is removed from the one or more pocket flaps 122.

It is noted herein the pocket flap 122 may be a single component or may be constructed from multiple sections, where the multiple sections are hinged or otherwise coupled together, to allow for an increase in living space proximate to the head of the user in an adjacent aircraft seat.

The PED holder 134 may be coupled to the pocket flap 122 and/or the main body 106 of the upper shell 104 via one or more PED hinges 210. For example, the one or more PED hinges 210 may include, but are not limited to, torque hinges. By way of another example, the one or more pocket flap hinges 208 may be spring-loaded. The PED holder 134 may be configured to actuate relative to the pocket flap 122 via the one or more PED hinges 210. For example, the PED holder 134 may rotate about the one or more PED hinges 210 through a select angular range. For instance, the PED holder 134 may rotate about the one or more PED hinges 210 between 0 degrees and 30 degrees. In addition, the PED holder 134 may rotate about the one or more PED hinges 210 between −15 degrees and 155 degrees. It is noted herein the upper pocket 120 may be configured to prevent the pocket flap 122 from rotating beyond 90 degrees.

The one or more PED hinges 210 may be configured to hold the PED holder 134 in a closed position absent an external force being applied to the PED holder 134 (e.g., by a user). The one or more PED hinges 210 may be configured to return the PED holder 134 from an open position to the closed position when an external force applied to the PED holder 134 (e.g., by a user, by a PED set on the PED holder 134, or the like) is removed from the PED holder 134.

It is noted herein the PED holder 134 may include an interlocking assembly (e.g., a hook-and-loop assembly, a tab-and-groove assembly, a snap-fit or interference assembly, or the like), or a magnetic retention assembly configured to hold the PED holder 134 within the PED cavity 136 in addition to or instead of the one or more PED hinges 210. It is noted herein a discussion of the use of magnetic components in a retention assembly for an aircraft tray table may be found in U.S. application Ser. No. 17/081,840, titled AIRCRAFT TRAY TABLE RETENTION ASSEMBLY, filed on Oct. 27, 2020, which is previously incorporated herein in the entirety.

It is noted herein the one or more pocket flap hinges 208 and the one or more PED hinges 210 may be independently actuatable. In addition, it is noted herein the actuation of the one or more PED hinges 210 may be dependent on the actuation of the one or more pocket flaps 122. For example, the one or more PED hinges 210 may be configured such that one or more PED holders 134 may not be actuatable via the one or more PED hinges 210 when the one or more pocket flaps 122 are in the open position.

The PED cavity 136 may be a selected depth within the pocket flap 122. For example, the selected depth may less than the thickness of the pocket flap 122, such that the PED holder 134 is not visible through an interior surface of the pocket flap 122 within the pocket cavity 124 and/or is not visible when the PED holder 134 is in an open position. It is noted herein the PED holder 134 not being visible through the interior surface of the pocket flap 122 may allow for a smooth surface usable as a tray surface where the pocket flap 122 is rotated to 90 degrees. By way of another example, the PED holder 134 may be equal to or greater than the thickness of the pocket flap 122, and pass through the interior surface of the pocket flap 122.

Figure 3:
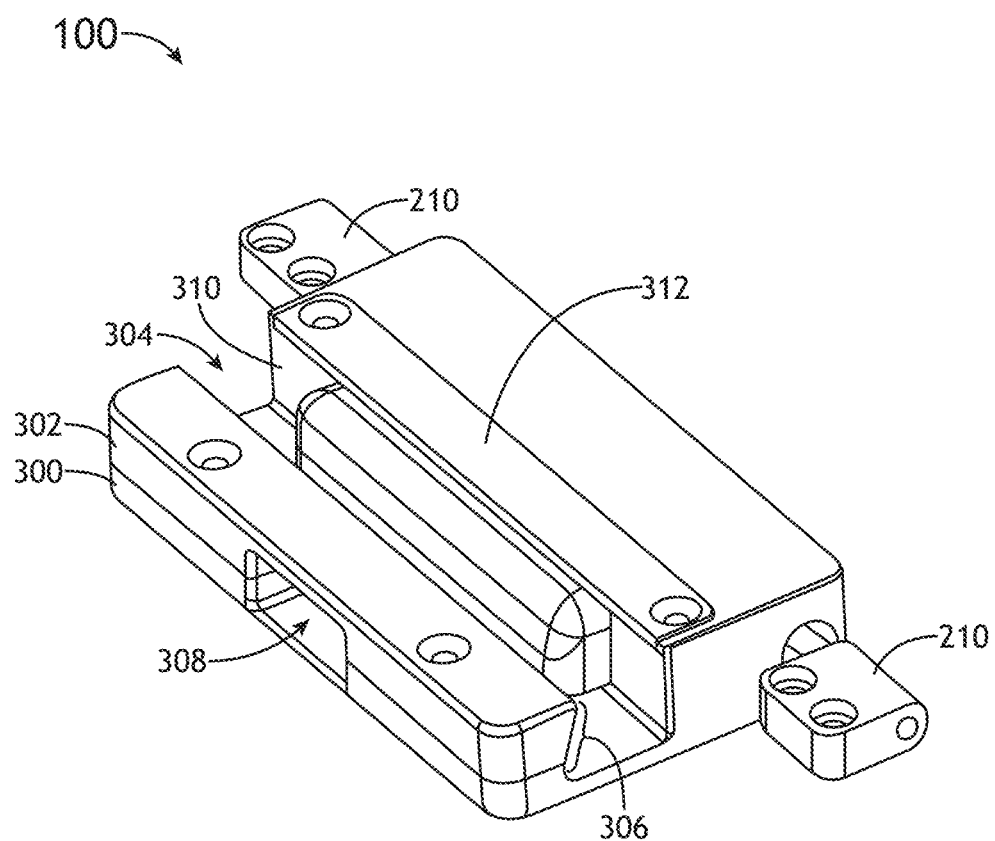
FIG. 3 illustrates a PED holder of an aircraft seat, in accordance with one or more embodiments of the disclosure.

FIG. 3 illustrates the PED holder 134 of the aircraft seat 100, in accordance with one or more embodiments of the disclosure.

The PED holder 134 may include a body 300. The PED holder 134 may include a primary jaw 302. The body 300 and the primary jaw 302 may define a channel 304. One or more sides 306 of the channel 304 may be slanted at a select angle. For example, the angle may be selected for purposes of holding a PED within the channel 304 at a select viewing angle.

The PED may include any electronic device known in the art. For example, the PED may be a handheld computer including, but not limited to, a tablet, a smartphone, a phablet, or the like. By way of another example, the PED may be any computer or computing device including one or more processors and memory. For instance, the PED may be a convertible laptop including, but not limited to, a laptop with a single-fold hinge, a laptop with a double-fold hinge, a laptop with a twist-and-fold hinge, a laptop with a detachable display device and/or a detachable user input device, or the like.

A side of the PED holder 134 may include a slot or groove 308, with which a user (e.g., passenger, crew member, or the like) may engage to actuate the PED holder 134. For example, the groove 308 may be in a side formed by the body 300 and/or the primary jaw 302. For instance, the groove 308 may be in a side formed by both the body 300 and the primary jaw 302. The groove 308 may correspond to the groove 138 in the pocket flap 122.

The PED holder 134 may include an auxiliary jaw 310. For example, the auxiliary jaw 310 may be configured to capture the PED when inserted by the user against the primary jaw 302. For example, the auxiliary jaw 310 may be spring-loaded and coupled to the body 300 with a bracket 312. The auxiliary jaw 310 may provide a force against a PED inserted into the channel 304, to hold the PED within the channel 304.

It is noted herein the PED holder 134 may include other capturing mechanisms instead of or in addition to the primary jaw 302 and the spring-loaded auxiliary jaw 310. For example, the other capturing mechanisms may include, but are not limited to, magnet-based jaws or hooks, lateral jaws or hooks, or the like. Therefore, the above description should not be interpreted as a limitation on the present disclosure but merely an illustration.

It is noted herein the PED holder assembly 132 may include components for passenger amenities instead of or in addition to the PED holder 134. For example, the components may include, but are not limited to, drop-down water bottle holders, cup holders, or the like. For instance, the components for passenger amenities may be installed on a factory floor or retrofitted on the aircraft. In addition, the components for passenger amenities and the PED holder 134 may be swappable by the user. Where the components for passenger amenities and the PED holder 134 are swappable, the non-used items may be stowed in the upper pocket 120, on the aircraft seat 100, or elsewhere within the aircraft cabin including the aircraft seat 100.

Although embodiments of the disclosure illustrate a smooth exterior surface of the pocket flap 122 with the PED holder 134, it is noted herein passenger amenities (e.g., cup holders, monitors or displays, or the like) may be coupled to the exterior surface of the pocket flap 122. In addition, it is noted herein the passenger amenities may be integrated into the pocket flap 122, forming a portion of the pocket flap 122.

It is noted herein the pocket cavity 124 may be usable with new-built aircraft seats 100. In addition, it is noted herein the pocket cavity 124 may be usable for retrofitting aircraft seats 100 (e.g., in particular, retrofitting aircraft seats 100 with additional usable space between seatback hoops).

FIGS. 4A-4D illustrate comparisons between known aircraft seats 400 and aircraft seats 100 including the pocket cavity 124, in accordance with one or more embodiments of the disclosure.

Figure 4A:
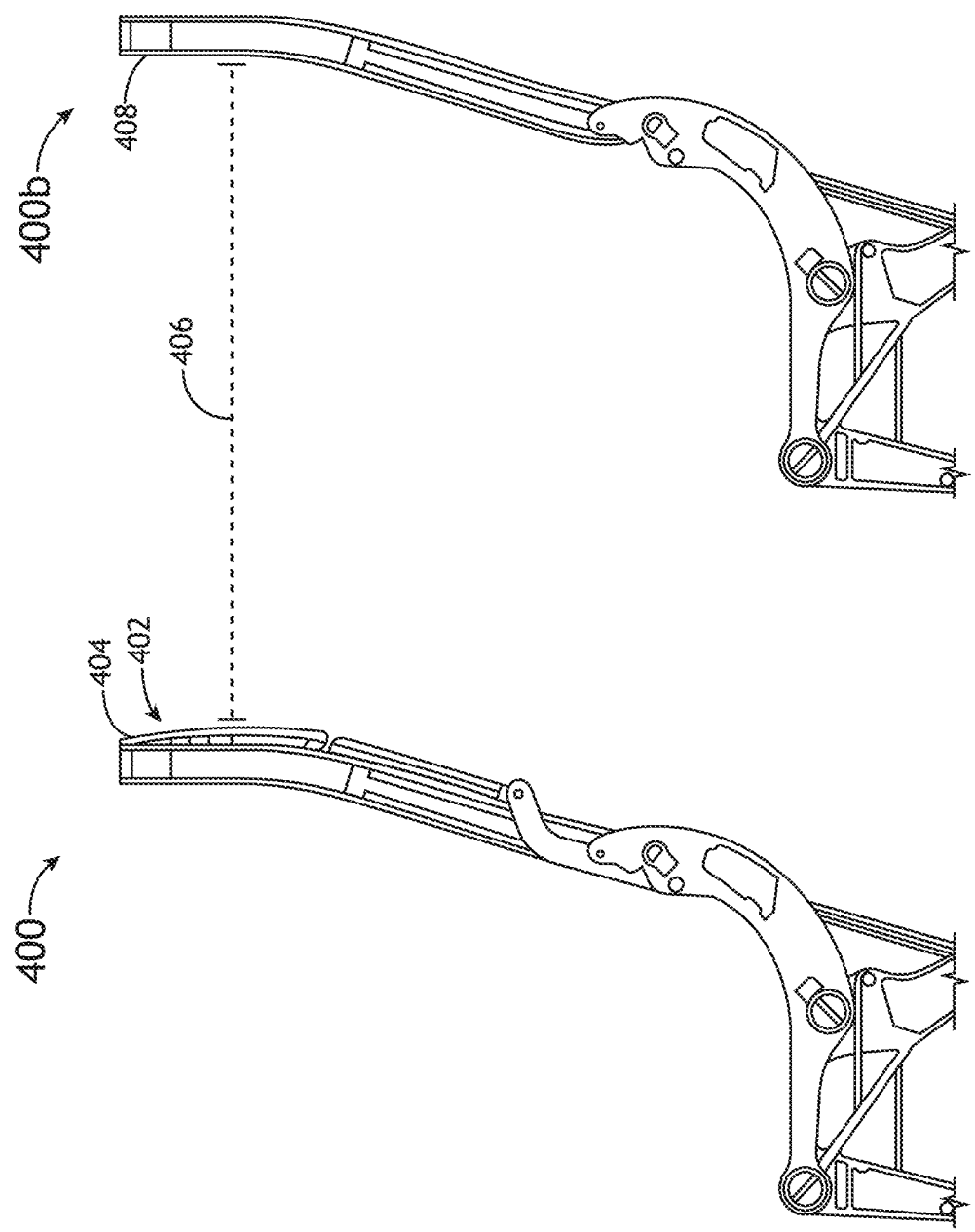
FIG. 4A illustrates a set of aircraft seats including a static pocket, in accordance with one or more embodiments of the disclosure.

As illustrated in FIG. 4A, the known aircraft seat 400 may include a static upper pocket 402 in an upper shell 404. For example, the static upper pocket 402 and/or the upper shell 404 may be concave toward an adjacent aircraft seat 400b. The known aircraft seat 400 may be separated by a distance 406 at the static upper pocket 402 from a seatback 408 of the adjacent aircraft seat 400b.

Figure 4B:
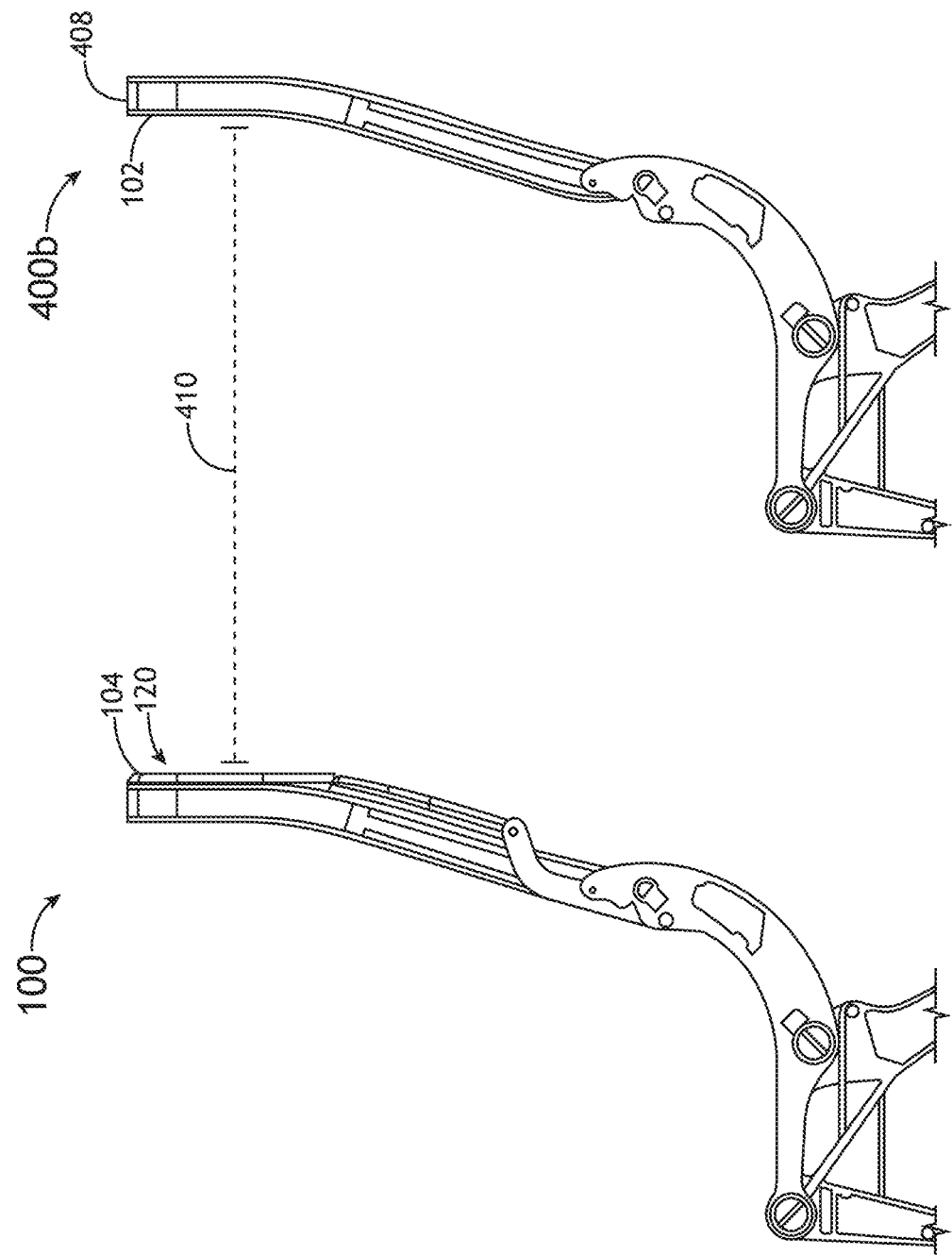
FIG. 4B illustrates a set of aircraft seats including an actuatable upper pocket, in accordance with one or more embodiments of the disclosure.

As illustrated in FIG. 4B, the upper pocket 120 and the upper shell 104 may include a flat vertical (or substantially vertical) exterior surface (e.g., as opposed to a concave surface). The aircraft seat 100 including the upper pocket 120 in the upper shell 104 may be separated by a distance 410 at the upper pocket 120 from a seatback 102 of an adjacent aircraft seat 100b.

Figure 4C:
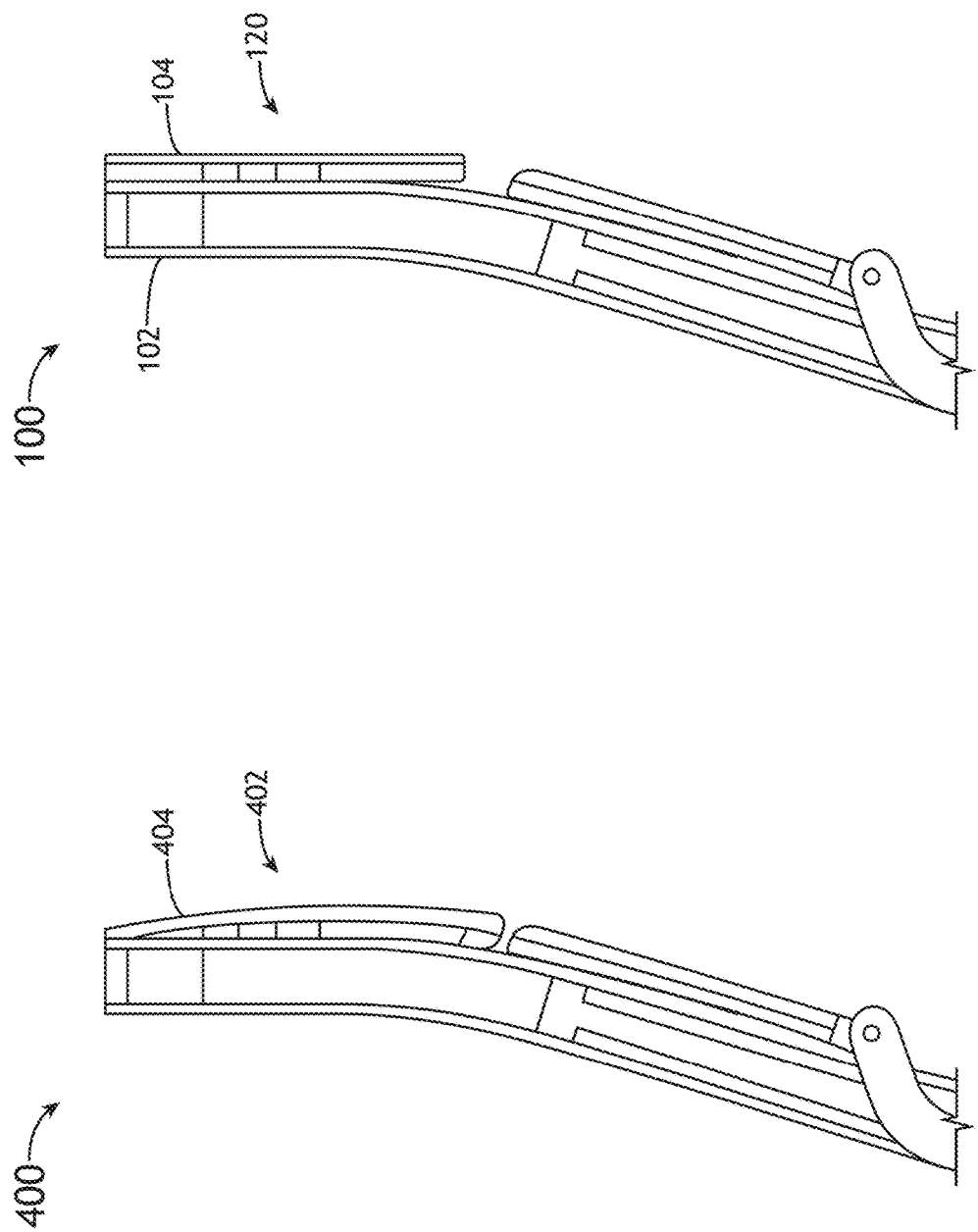
FIG. 4C illustrates a comparison between an aircraft seat including a static pocket and an aircraft seat including an actuatable upper pocket, in accordance with one or more embodiments of the disclosure.

It is noted herein FIGS. 4C and 4D illustrates the flat design of the upper pocket 120 and the upper shell 104, as compared to the concave design of the static upper pocket 402 and/or the upper shell 404.

As illustrated in FIGS. 4A-4D, the upper pocket 120 results in a thinner seatback 102 of the aircraft seat 100 than as allowed for by the static upper pocket 402 of the aircraft seat 400, increasing the distance 410 representing the living space between the aircraft seat 100 and the adjacent aircraft seat 100b, as compared to the distance 406 representing the living space between the aircraft seat 400 and the adjacent aircraft seat 400b.

In this regard, the aircraft seat 100 includes the upper pocket 120 with the actuatable pocket flap 122, allowing the upper pocket 120 to be more compact to increase the living space proximate to the head of the user in the adjacent aircraft seat 100b as compared to the living space afforded by a large static upper pocket 402. In addition, the upper pocket 120 includes a PED holder 134. For example, the PED holder 134 is positioned within the upper pocket 120 to provide an improved viewing angle of the PED for the user and/or allow for the simultaneous support of the PED and usage of the aircraft tray table 108.

It is noted herein the upper shell 104 and/or components of the upper shell 104 (e.g., the upper pocket 120 and/or components of the upper pocket 120, or the like) may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For instance, the upper shell 104 and/or components of the upper shell 104 (e.g., the upper pocket 120 and/or components of the upper pocket 120, or the like) may be compliant with aviation guidelines and/or standards set forth in at least 14 C.F.R. Part 25, AIRWORTHINESS STANDARDS: TRANSPORT CATEGORY AIRPLANES in effect at the time of filing.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An upper shell for an aircraft seat, comprising:
   a main body comprising a lip;
   an upper pocket, comprising:
      a pocket flap coupled to the main body via at least one pocket flap hinge; and
      a pocket cavity defined within the main body, the pocket cavity being accessible following an actuation of the pocket flap into a pocket flap open position via the at least one pocket flap hinge, the pocket flap being configured to cover at least a portion of the pocket cavity when the pocket flap is in a pocket flap closed position; and
   a personal electronic device (PED) holder assembly, comprising:
      a PED holder coupled to at least one of the pocket flap or the main body via at least one PED hinge, the PED holder being configured to hold a PED following an actuation of the PED holder into a PED holder open position via the at least one PED hinge; and
      a PED cavity defined within an area of the upper pocket, the PED holder being configured to fit within the PED cavity when in a PED holder closed position,
   the PED holder assembly being positioned in an area defined within the upper pocket, wherein the lip is configured to make contact with the pocket flap at one or more points along the pocket flap and is configured to prevent the pocket flap from entering the pocket cavity when the pocket flap is in the pocket flap closed position, a section of the pocket flap proximate to the one or more points along the pocket flap and an interior pocket cavity surface defining a gap for access to the pocket cavity when the pocket flap is in the closed position.

2. The upper shell of claim 1, the upper pocket including a flat vertical exterior surface visible when the pocket flap is in the pocket flap closed position, the PED holder including a flat vertical exterior surface visible when the PED holder is in the PED holder closed position.

3. The upper shell of claim 1, at least a portion of the main body defining the pocket cavity being surrounded by an upper seat frame.

4. The upper shell of claim 1, the PED holder comprising:
   a body;
   a primary jaw coupled to the body; and
   a channel defined within the body, the channel being defined by at least one surface of the body and at least one surface of the primary jaw.

5. The upper shell of claim 4, the channel being slanted at an angle, the angle being selected to hold a PED inserted within the channel at a select viewing angle.

6. The upper shell of claim 5, the PED holder further comprising:
   a spring-loaded auxiliary jaw coupled to the body via a bracket, the spring-loaded auxiliary jaw being configured to provide a force against the PED inserted into the channel to hold the PED within the channel.

7. The upper shell of claim 4, the PED holder further comprising:
   a recess defined within at least a second surface of the body and at least a second surface of the primary jaw.

8. The upper shell of claim 1, the PED cavity including a depth less than a thickness of the pocket flap.

9. The upper shell of claim 1, further comprising:
   one or more channels coupled to the pocket cavity; and
   one or more openings coupled to the one or more channels,
   the one or more channels and one or more openings being configured to allow for the exit of waste from the pocket cavity.

10. The upper shell of claim 9, the one or more channels being defined by at least one of an interior rear bezel or an exterior rear bezel, the one or more openings being cut within the exterior rear bezel.

11. The upper shell of claim 1, further comprising:
   a latch assembly, comprising:
      a first component coupled to the main body; and
      a second component on an aircraft tray table coupled to the aircraft seat.

12. An upper shell for an aircraft seat, comprising:
   a main body;
   an upper pocket, comprising:
      a pocket flap coupled to the main body via at least one pocket flap hinge; and
      a pocket cavity defined within the main body, the pocket cavity being accessible following an actuation of the pocket flap into a pocket flap open position via the at least one pocket flap hinge, the pocket flap configured to cover at least a portion of the pocket cavity when the pocket flap is in a pocket flap closed position; and
   a personal electronic device (PED) holder assembly, comprising:
      a PED holder coupled to at least one of the pocket flap or the main body via at least one PED hinge, the PED holder being configured to hold a PED following an actuation of the PED holder into a PED holder open position via the at least one PED hinge; the PED holder comprising:
a body;
a primary jaw coupled to the body;
a channel defined within the body, the channel being defined by at least one surface of the body and at least one surface of the primary jaw, the channel being slanted at an angle, the angle being selected to hold a PED inserted within the channel at a select viewing angle; and
a spring-loaded auxiliary jaw coupled to the body via a bracket, the spring-loaded auxiliary jaw being configured to provide a force against the PED inserted into the channel to hold the PED within the channel; and
a PED cavity defined within an area of the upper pocket, the PED holder being configured to fit within the PED cavity when in a PED holder closed position, the PED holder assembly being positioned in an area defined within the upper pocket.

13. The upper shell of claim 12, the upper pocket including a flat vertical exterior surface visible when the pocket flap is in the pocket flap closed position, the PED holder including a flat vertical exterior surface visible when the PED holder is in the PED holder closed position.

14. The upper shell of claim 12, at least a portion of the main body defining the pocket cavity being surrounded by an upper seat frame.

15. The upper shell of claim 12, the PED holder further comprising:
a recess defined within at least a second surface of the body and at least a second surface of the primary jaw.

16. The upper shell of claim 12, the PED cavity including a depth less than a thickness of the pocket flap.

17. The upper shell of claim 12, further comprising:
a latch assembly, comprising:
a first component coupled to the main body; and
a second component on an aircraft tray table coupled to the aircraft seat.

* * * * *